United States Patent [19]

Lavene

[11] Patent Number: 4,603,373
[45] Date of Patent: Jul. 29, 1986

[54] OUTER WRAPPING FOR A METALLIZED WOUND CAPACITOR

[75] Inventor: Bernard Lavene, Ocean, N.J.

[73] Assignee: Electronic Concepts, Inc., Eatontown, N.J.

[21] Appl. No.: 667,287

[22] Filed: Nov. 1, 1984

Related U.S. Application Data

[63] Continuation-in-part of Ser. No. 513,271, Jul. 13, 1983, Pat. No. 4,516,187.

[51] Int. Cl.⁴ .................... H01G 1/14; H01G 7/00
[52] U.S. Cl. .................... 361/306; 29/25.42; 361/404
[58] Field of Search .............. 29/25.42; 361/433 W, 361/433 C, 301, 306, 308, 309, 310, 323, 402, 404, 321 C

[56] References Cited

U.S. PATENT DOCUMENTS

| | | | |
|---|---|---|---|
| 1,870,803 | 8/1932 | Fried | 361/301 |
| 2,774,018 | 12/1956 | Weiss | 361/301 |
| 3,034,198 | 5/1962 | Rayburn et al. | 361/323 X |
| 3,185,759 | 5/1965 | Sheehan | 174/52 |
| 3,192,307 | 6/1965 | Lazar | 361/404 X |
| 3,435,308 | 3/1969 | Fanning | |
| 3,444,436 | 5/1969 | Coda | 361/306 X |
| 3,731,130 | 5/1973 | Dutta | 29/25.42 X |
| 4,170,812 | 10/1979 | Rayno | 29/25.42 |
| 4,240,127 | 12/1980 | Fanning et al. | 361/304 |
| 4,267,565 | 5/1981 | Puppolo et al. | 361/433 |
| 4,352,145 | 9/1982 | Stockman | 29/25.42 X |
| 4,363,162 | 12/1982 | Price | 29/25.42 |
| 4,467,401 | 8/1984 | Siebert et al. | 361/321 C X |

*Primary Examiner*—Donald A. Griffin
*Attorney, Agent, or Firm*—Ratner & Prestia

[57] ABSTRACT

A wound capacitor and method therefor having metallized elongated dielectric webs. An additional dielectric web is wound about the capacitor roll and forms a protective wrap. The additional web has a pair of metal foil band terminals formed on the side of the additional web remote from the capacitor roll with each band disposed adjacent a respective end of the capacitor roll and extending there beyond. Terminals are bonded to each end of the capacitor with each terminal contacting a respective metallized electrode and an adjacent metallic band. An additional dielectric web having a plurality of metal foil bands is also wound about a capacitor roll of electrodes formed in staggered and overlapping arrangement relative to each other. The capacitor roll is then chopped to form substantially small sized capacitors each having a protective wrap with a pair of metal foil band terminals.

9 Claims, 10 Drawing Figures

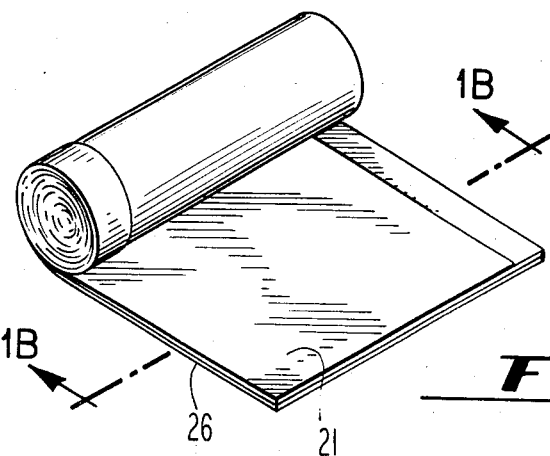
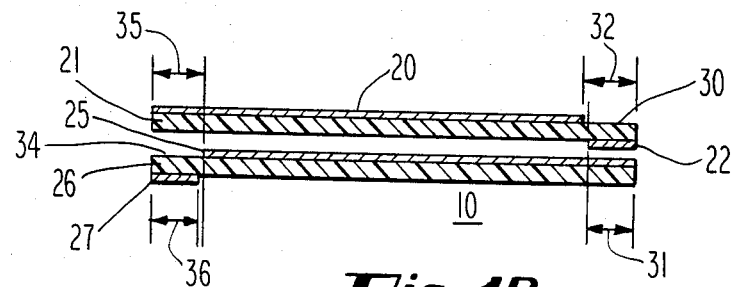
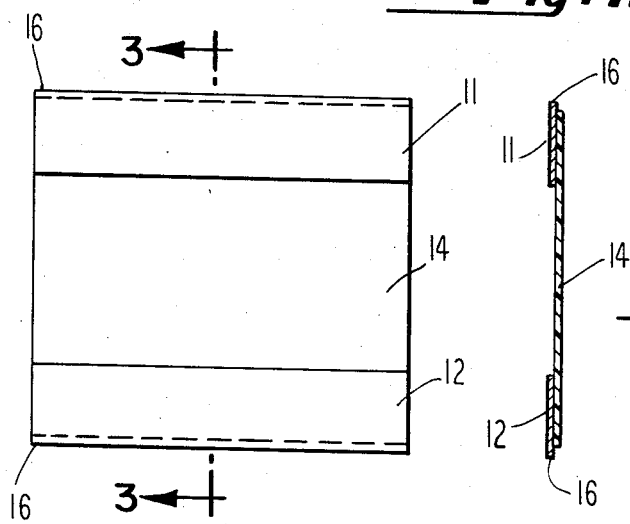
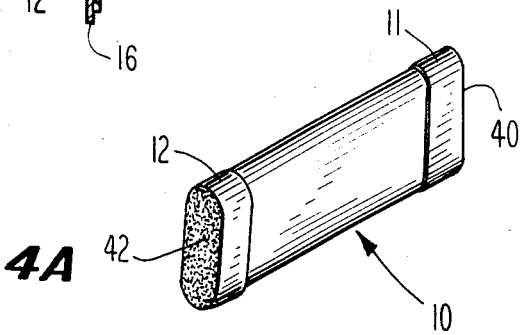

OUTER WRAPPING FOR A METALLIZED WOUND CAPACITOR

This is a continuation-in-part of Application Ser. No. 513,271 filed July 13, 1983 now U.S. Pat. No. 4,516,187.

BACKGROUND OF THE INVENTION

1. Field of the Invention

This invention relates to metallized dielectric wound capacitors, and more particularly to an outer wrap for such a wound capacitor.

2. Background Art

It has been known that direct mounting of electrical components, such as metallized wound capacitors, is particularly useful in thin and thick integrated hybrid circuitry. Connections to a circuit board have been made by using reflow soldering or similar means. Accordingly, the component has been required to have planar external terminal leads in order to provide a multiplicity of such components on a board to achieve the desired package density and compatability of other components. Previous wound capacitors have left much to be desired as a result of their relatively high costs and their protruding terminal leads. In fact, even after the capacitor has been connected, in many applications it could not withstand severe environmental requirements such as for military purposes.

Metallized dielectric wound capacitors having a protective and sealing outer wrap with planar terminal connections, which meet these problems are disclosed in applicant's copending application Ser. No. 513,271, filed July 13, 1983. These bands are comprised of vapor deposited metal and are too thin to withstand very high temperature soldering temperatures.

Capacitors having various forms of metallized connections are described in the following U.S. Pat. Nos.:

|           |           |
|-----------|-----------|
| 3,435,308 | 4,352,145 |
| 4,170,812 | 4,267,565 |
| 4,240,127 | 4,363,162 |

Accordingly, an object of the present invention is a metallized dielectric wound capacitor having a protective and sealing outer wrap which also provides planar terminal connections on the outer end surface of the capacitor which may be soldered to printed circuit boards using high temperature soldering technique.

SUMMARY OF THE INVENTION

A metallized wound capacitor and method therefor in which first and second elongated dielectric webs have at least one electrode formed on at least one face. The dielectric webs are convolutely arranged in a capacitor roll with the electrodes in superposed relation to each other. A third dielectric web is wound about the capacitor roll to form a protective wrap. The third web has a first and a second metallic foil band secured to the side of the third web remote from the capacitor roll and each band is disposed adjacent a respective end of the roll.

BRIEF DESCRIPTION OF THE DRAWINGS

FIG. 1A is a diagrammatic view illustrating one embodiment of the invention for providing an outer wrapping and planar metal foil terminations for a wound capacitor;

FIG. 1B is a cross-section of two webs along line 1B of FIG. 1A;

FIG. 2 is a bottom view of the protective wrap web of FIG. 1A;

FIG. 3 is a cross-section of the web of FIG. 2 taken along line 3—3;

FIG. 4A is a perspective view of the finished capacitor of FIG. 1A;

DETAILED DESCRIPTION OF THE INVENTION

Figure 4B:
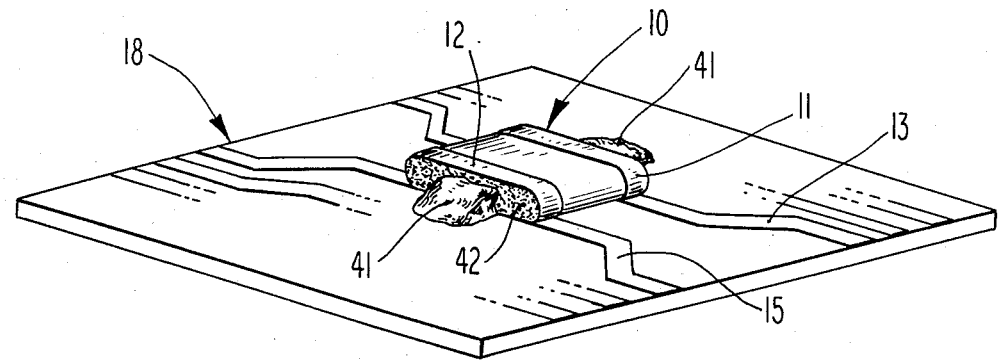
FIG. 4B is a perspective view of the finished capacitor soldered to a printed circuit board.

Referring now to FIGS. 1A–B, a capacitor 10 is shown comprising a first elongated dielectric web 21 having an electrode 20 metallized on an upper face thereof. A second elongated dielectric web 26 is aligned with and is of the same width as web 21 and also has an electrode 25 metallized on an upper face thereof. Electrodes 20,25 are of less width than that of web 21,26 and extend from one longitudinal edge thereof leaving respective safe edges or bare margins 30,34 of the web along opposite edges thereof. Specifically, electrodes 20 extends from the left edge of web 21 and electrode 25 extends from the right edge of web 26.

Dielectric web 21 is dual metallized by means of a second substantially thin width electrode 22 metallized on its lower face only directly below margin 30. Electrode 22 extends from the right longitudinal edge of web 21, which is opposite to that edge to which electrode 20 extends. Similarly, dielectric web 26 has a second electrode 27 metallized on a lower face thereof only directly below bare margin 34. Layer 27 extends from the left longitudinal edge remote to that edge from which electrode 25 extends. Specifically, electrode 22 is of width 31 which is equal to width 32 less the manufacturing tolerance. Similarly, electrode 27 is of width 36 which is equal to width 35 less the manufacturing tolerance. Thus, no portion of layer 22 is formed under electrode 20, and substantially no portion of the area of electrode 27 extends below electrode.

Metallized webs 21,26 are disposed in superposed relation to each other with bare margins 30,34 respectively disposed at opposite edges of the superposed webs. The webs are then wound in conventional manner. On completion of the winding of the metallized webs into a capacitor roll, electrodes 22,25 engage and act as an effective single conductor to provide twice the surface area in contact with the metal spray. Similarly, on rolling, electrodes 20,27 provide twice the effective surface area.

On completion of the winding of capacitor roll or coil 10, the capacitor coil is flattened and then cured in conventional manner and then heated to temper dielectric webs 21,26. Thereafter, the ends of capacitor 10 are sprayed with a high velocity mixture of compressed air and babbit produced from an electric arc gun. Babbit is a high purity tin.

Referring now to FIG. 2, web 14 is shown. Web 14 is a plastic film with a thickness of approximately one-half mil and a width for example of approximately fifteen-sixteenths of an inch constructed of a dielectric material preferably mylar, polyetherimide (ULTEMP), polysulfone, polyester or polycarbonate. Web 14 also has a coating of hot melt adhesive on one side to assist in securing it to and sealing capacitor 10. The adhesive may for example be polyester or acrylic.

Web 14 also has two laminate metallic bands 11 and 12 of uniform width extending parallel to each other longitudinally with respect to web 14. Metallic bands 11 and 12 comprise strips of metal foil, such as tin-copper foil and have a thickness of approximately one-quarter mil. Bands 11 and 12 are secured to web 14 by pressure sensitive adhesive. The adhesive, preferably an acrylic, is approximately one-half mil thick. Bands 11 and 12 extend a short distance beyond the longitudinal edges of web 14 forming margins 16. Web 14 is coated with heat sensitive adhesive on the surface opposite bands 11 and 12.

FIG. 3 shows a cross section of web 14. Margins 16 extend beyond the longitudinal edges of web 14. The wound capacitor 10 is then wrapped in web 14 thereby producing the capacitor 10 shown in FIGS. 4A and 4B. First the ends of capacitor 10 are dust sprayed with babbit, a high quality tin, to form a good electrical contact. The dust layer is then covered with a layer of epoxy silver to seal capacitor 10 from moisture and sprayed with molten metal particles at high speed using an electric arc gun to form terminals 40 and 42 which are electrically coupled to bands 11 and 12. Margins 16 extend approximately fifteen thousandths of an inch beyond the ends of capacitor 10 and the cavity created by this extension is substantially filled by the layers of bobbit, epoxy silver and metal spray.

It will now be understood by those skilled in the art that web 14 forms a protective outer wrap which seals and closes the winding of webs 21,26 and thereby prevents the web from unraveling. In addition, the metal foil metallized terminals 11,12 form outer flattened band terminals or end cap terminals which are electrically connected to the respective electrodes by way of spray terminals 40,42 and can withstand high temperature soldering techniques.

When soldering capacitor 10 to conductive bands 13,15 of printed circuit board 18 shown in FIG. 4B, a solder fillet 41 is placed on the board 18 at the location where metal foil terminals 10,12 are to be soldered. Solder fillets 41 move by capillary action both below terminals 11, and upwardly above the portion of margin 16 in contact with board 18 during soldering thereby helping to secure capacitor 10 to circuit board 18 and making electrical contact between bands 11,12 and terminals 40,42 and between bands 11,12 and conductive land 13,15. Thus, capacitor 10 may be used in reflow soldering applications, for example, where the side of the capacitor is to contact the circuit board.

Figure 5A:
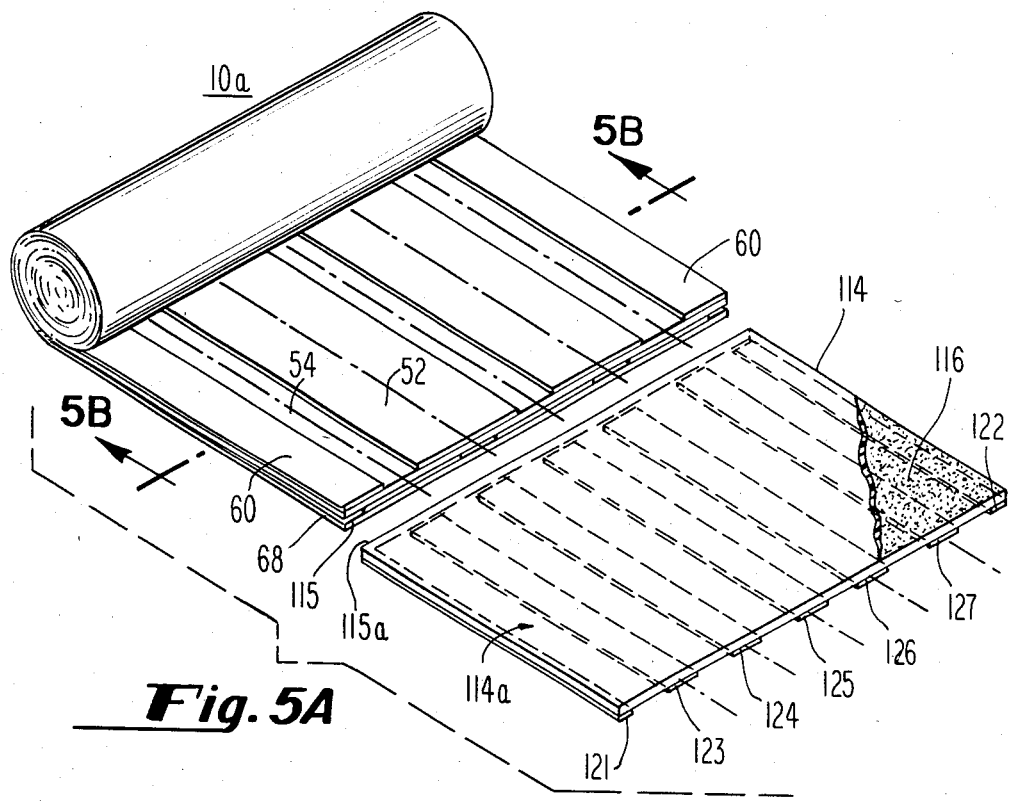
FIG. 5A is a diagrammatic view illustrating another embodiment of the invention.
Figure 5B:
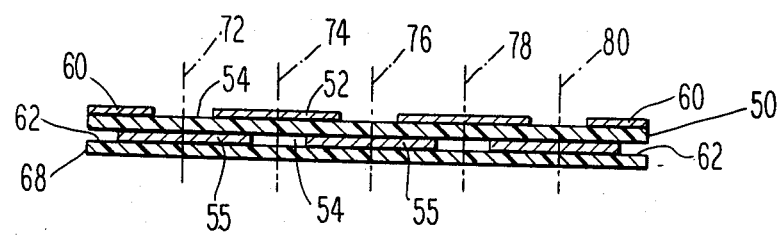
FIG. 5B is a cross-section of two webs along line 5B of FIG. 5A.
Figure 6:
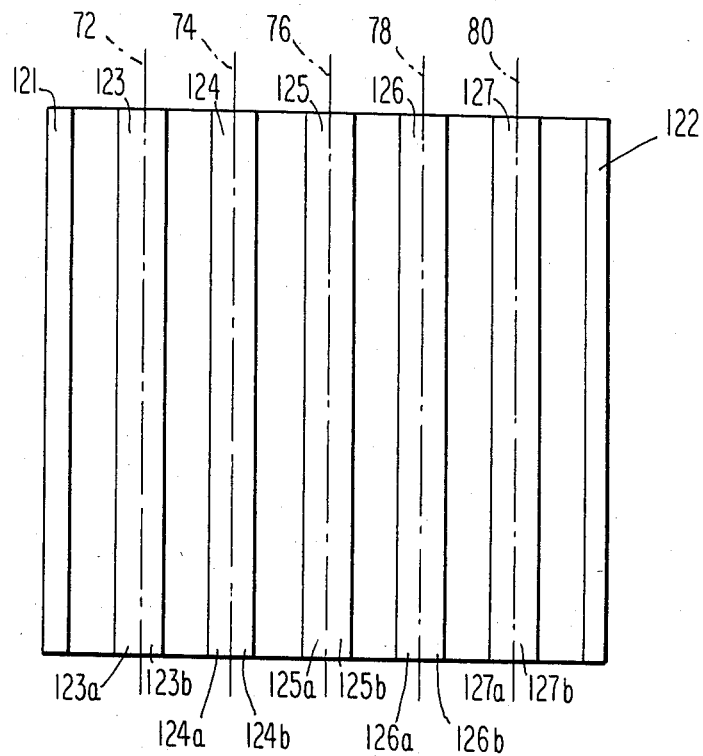
FIG. 6 is a bottom view of the protective wrap web of FIG. 5A.
Figure 7:
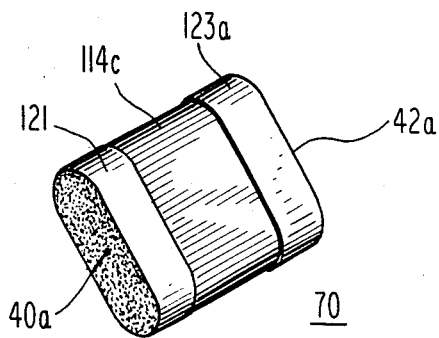
FIG. 7 is a perspective view of the chopped and finished capacitor of FIG. 5A.

Referring now to FIGS. 5A-B, 6, there is shown a further embodiment of the invention in which an outer wrap web 114 is provided for a capacitor coil 10a formed of a plurality of concentric longitudinally split metal foil electrodes disposed between dielectric webs in insulated and overlapping relation to one another. Individual small-sized chip capacitors 70, FIG. 7, are formed by chopping the coil as disclosed in applicant's U.S. Pat. No. 4,378,620, which is incorporated herein by reference.

Capacitor coil 10a comprises a mated pair of dielectric webs 50,68 with each web having a multiplicity of thin parallel metallic electrodes 52,55 respectively deposited on one side thereof and running along the length of the webs. The electrodes are separated by a set of parallel open spaces 54. The arrangement is such that outermost electrodes 60 lie along the edges of the first web 50 and on the second web 68 there are open unplated areas 62 along the corresponding edges. The electrodes are arranged across the width of the webs so that the electrode space pattern on one is in a staggered and overlapping arrangement relative to that in the other so that substantially the central portion of a plated area on one of the webs is more or less over the center line of the open spaces directly above or below it.

As the winding of the coil is being completed, a short length of outer wrap web 114 is provided having the same width as webs 50,68. The longitudinal edges of web 114 are aligned with the corresponding longitudinal edges of webs 50,68. The trailing transverse edge 115 of webs 50,68 is slightly ahead of starting transverse edge 115a of web 114. In conventional manner, upper face 114a of web 114 has an adhesive melt 116 formed thereon. Web 114 is of sufficient length so that after it may be wound around capacitor 10a several turns. Capacitor 10a is then tempered.

Web 114 has parallel electrodes or terminals 121-127. Electrodes 121-127 are formed of a metal foil such as tin-copper foil and are secured to the lower face of wrap 114 throughout substantially the entire length of wrap 114 by pressure sensitive adhesive. More specifically, outer terminals 121,122 lie along the edges of web 114 and are adapted to form terminals for electrodes 60. Metallized terminal 123 is longitudinally bisected by center line 72 defining terminal pair 123a,b which form terminals for electrode 55 in the manner later to be described. Similarly, metallized terminal 114 is bisected by center line 74 defining metallized terminal pair 124a,b which form terminals for electrode 52, etc. In each of the resultant chip capacitors that are formed by chopping coil 10a, it will be understood that each of the outer terminals e.g., each of terminals 121,123a has a width which is preferably about twenty-five percent of the width between ends of the respective chip capacitor.

In the winding operation, web 114 is required to be wound carefully so that its starting edge 115a starts winding after edge 115. In this manner, as an integral part of the winding operation, web 114 is wound around the outer electrode layer of the capacitor coil with the metallized electrodes not contacting terminals 121-127. Accordingly, there is formed a protective outer wrap with terminals 121-127 not connected to the capacitor electrodes at this time.

On completion of the capacitor roll surrounded by web 114, the capacitor coil is flattened in conventional manner and then heated to temper dielectric webs 50,68 and to melt adhesive 116 thereby to form web 114 into a protective oval sleeve.

As described in U.S. Pat. No. 4,378,620, the staggered arrangement formed by capacitor coil 10a provides horizontal series of individual parallel plate capacitors 70 aligned next to each other along the coil and within the outer wrap 114. These capacitors are separated from each other by chopping the finished coil vertically along lines 72, 74, 76, 78, 80 to provide a clear cut through the web 114 and alternating open spaces and electrodes in webs 50,68. At the completion of the operation, there are formed a plurality of substantially small flattened rectangular shaped chip capacitors 70 shown in FIG. 7, each of which has an outer wrap protecting a series of concentric conductive elements with terminal bands formed adjacent both capacitor ends. Foil terminals 121 and 123a do not extend beyond outer wrap 114c because of the chopping procedure. The ends of capacitor 70 are spray dusted with babbit, as described previously, to form an electrical contact with terminals 121,123a and are then covered with a layer of epoxy silver to seal capacitor 70.

As shown in FIG. 7, the chip capacitor 70 is protected by outerwrap section 114c and thereafter the ends of capacitor 70 may be sprayed with a high velocity mixture of compressed air and molten fine particles of metal. Specifically, as set forth in said patent, individual capacitors are lined up, in such a manner that the chopped ends form a composite assembly, and then sprayed. The spray forms terminal 40a in contact with electrode 55 as well as with metal foil terminal 123a. Further, the spray forms terminal 42a which is in contact with electrode 60 as well a with metal foil terminal 121.

It is in this manner that a section of web 114 forms a protective outer wrap or sleeve which seals and closes chip capacitor 70. In addition, the metal foil band terminals 121,123a form separate outer flattened end cap terminals which are electrically connected to the respective electrodes by way of spray terminals 42a,40a and are capable of withstanding high temperature soldering techniques. Chip capacitor 70 may be made of substantially the small size of ceramic capacitors such as 0.050×0.150×0.150 approximately.

The principles and objects of the invention having now been explained, it is to be understood that many modifications may be made within the spirit and scope of the invention. For example, capacitors which are square rather than elliptical may be used.

What is claimed is:

1. An outer protective wrap for a metallized wound capacitor having capacitor electrodes comprising:
    a web having first and second electrodes formed of metal foil bands disposed thereon, said foil band electrodes being separate from but electrically connected to said capacitor electrodes and disposed parallel to each other and extending beyond the longitudinal edges of the wrap.

2. The metallized wound capacitor of claim 1 in which the first and second laminate metal foil band electrodes extend beyond the respective end of the roll.

3. A metallized wound capacitor comprising:
    first and second elongated dielectric webs each having at least one capacitor electrode formed on each one face thereof, the dielectric webs being convolutely arranged in a capacitor roll with the capacitor electrodes in superimposed relation to each; and
    a third dielectric web wound about the capacitor roll to form a protective wrap, the third web having first and second laminate metal foil band electrodes separate from but electrically connected to the capacitor electrodes, the band electrodes being formed on the side of the third web remote from the capacitor roll and each band electrode disposed adjacent a respective end of the roll.

4. The metallized wound capacitor of claim 3 in which there is provided conductors formed on the ends of the capacitor roll each electrically connected to a respective capacitor electrode and to the adjacent metal foil band electrode—thereby forming an end cap terminal for the capacitor.

5. The metallized wound capacitor of claim 3 in which the metal foil band electrode is electrically coupled to the end terminal and to conductive land of a printed circuit board by a solder fillet.

6. The metallized wound capacitor of claim 3 in which the capacitor is flattened and heated to temper the dielectric webs whereby the third dielectric web forms an outer wrap which seals and closes the capacitor roll and the first and second metal foil band electrodes are flattened.

7. The metallized wound capacitor of claim 3 in which the first and second metal foil band electrodes comprise laminate metal foil bands.

8. A method of making wound capacitors which comprises the steps of:
    (a) winding a pair of elongated dielectric webs each having at least one electrode formed on at least one face thereof to form a cylindrical capacitor coil with the electrodes in superposed relation to each other;
    (b) applying to one side of an additional dielectric web first and a second metal foil band electrodes extending substantially parallel to each other longitudinally of the additional web and extending from respective longitudinal edges; and
    (c) winding the additional web around the capacitor coil with metallic ribbons being remote from the capacitor coil and with the starting transverse edge of the additional web following the trailing transverse edge of the pair of dielectric webs whereby to seal and close the capacitor coil and to form the metal foil band electrodes into metallic terminal bonds.

9. A method of making substantially small sized wound capacitors which comprises the steps of:
    (a) applying a plurality of continuous spaced metallic electrodes on one side of each of a pair of dielectric webs;
    (b) mating the pair of webs with the electrodes in each web being in a staggered and overlapping arrangement relative to each other;
    (c) winding the mated webs to form a cylindrical layered capacitor coil defining an alternating arrangement of continuous electrodes spaced from layer to layer;
    (d) applying to one side of an additional dielectric web a plurality of metal foil band electrodes longitudinally of the additional webs;
    (e) winding the additional web around the capacitor coil with the metal foil electrodes being superposed with associated metallic electrodes; and
    (f) chopping the additional web and capacitor coil through the alternating open spaces and metal foil electrodes to form individual capacitors of wound continuous electrodes having a protective wrap with a pair of outer metal foil band electrodes.

* * * * *